March 17, 1953   M. G. BARKER   2,631,395
ANIMATED ADVERTISING DISPLAY
Filed May 12, 1951   3 Sheets-Sheet 1

INVENTOR.
Melvin G. Barker
BY Robert H. Wendt
Attorney

March 17, 1953     M. G. BARKER     2,631,395
ANIMATED ADVERTISING DISPLAY

Filed May 12, 1951     3 Sheets-Sheet 2

INVENTOR.
Melvin G. Barker
BY Robert H. Wendt
Attorney

March 17, 1953  M. G. BARKER  2,631,395
ANIMATED ADVERTISING DISPLAY
Filed May 12, 1951  3 Sheets-Sheet 3

INVENTOR.
Melvin G. Barker
BY Robert H. Wendt
Attorney

Patented Mar. 17, 1953

2,631,395

UNITED STATES PATENT OFFICE 2,631,395

ANIMATED ADVERTISING DISPLAY

Melvin G. Barker, Highland Park, Ill.

Application May 12, 1951, Serial No. 226,078

1 Claim. (Cl. 40—138)

The present invention relates to animated advertising displays, and is particularly concerned with an improved advertising display adapted to be used on vehicles, and actuated by any of the movements of the vehicle incident to travel.

One of the objects of the present invention is the provision of an improved animated advertising display which can be made so compact and thin that it can be used in the place of any advertising cards, such as those which are usually supported in metal guides or frames on public vehicles.

Another object of the invention is the provision of an improved animated advertising display which is adapted to be animated or moved by the side sway of the vehicle or changes of direction, instead of being operated only by the stopping and starting of the vehicle, so that animation takes place constantly at irregular intervals of time, depending upon the irregularities of the track or changes of direction, thereby constantly causing attention to be drawn to the advertising display.

Another object of the invention is the provision of an improved animated advertising display which does not require any mechanical driving devices, such as motors, springs, etc., and which is ready for animation or movement at any time after its installation without necessity for further attention.

Another object of the invention is the provision of improved forms of construction for animated advertising displays which may be manufactured at a very low cost, which utilize a minimum number of parts, and which are simple and durable and adapted to perform their function for a long period of time.

Another object of the invention is the provision of an improved animated sign which may be used for a multiplicity of different purposes, such as the simulation of moving eye pupils in a face, simulation of a stroke of a paint brush distributing paint, simulation of the appearance or disappearance of an article relative to the hand of the holder, simulation of liquid being poured out of a bottle or filling a glass, simulation of the lighting of a cigar or cigarette, or the taking of gum out of a pack, or the "Go" signal on a traffic light.

Other objects and advantages of the invention will be apparent from the following description and the accompanying drawings, in which similar characters of reference indicate similar parts throughout the several views.

Referring to the drawings accompanying this specification of which there are

Figure 1:
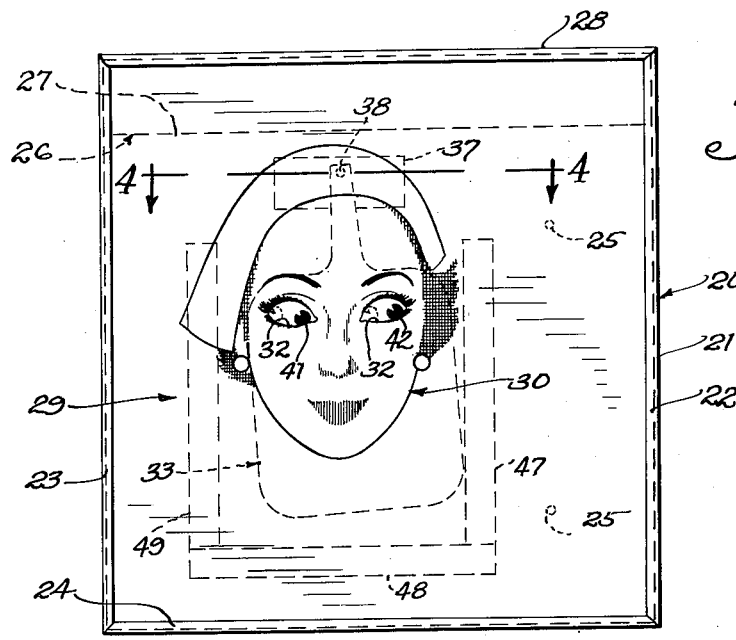
Fig. 1 is a front elevational view of an advertising display installation embodying the invention.
Figure 2:
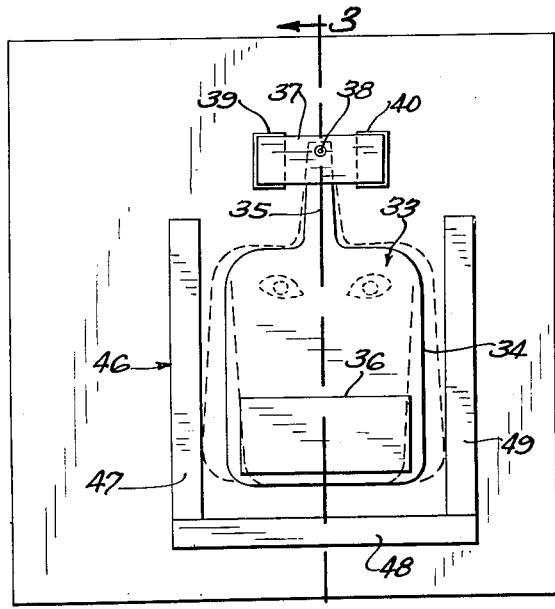
Fig. 2 is a rear elevational view of the card employed in Fig. 1.
Figure 3:
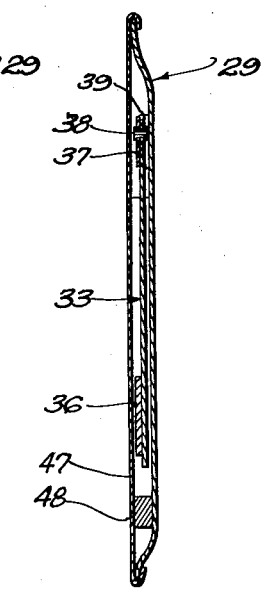
Fig. 3 is a vertical sectional view taken on the plane of the line 3—3 of Fig. 2.
Figure 4:
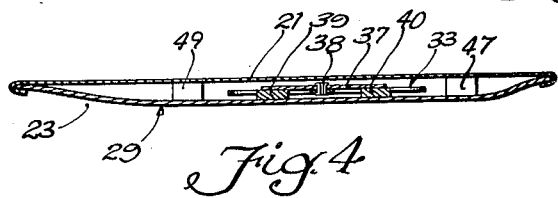
Fig. 4 is a fragmentary horizontal sectional view taken on the plane of the line 4—4 of Fig. 1.

Referring to Figs. 1 to 4, 20 indicates a card mounting frame of the type employed in street cars and subway cars for supporting advertising cards. Such a frame includes a metal plate 21 of rectangular shape and provided with substantially U-shaped, inwardly turned flanges 22, 23, on both sides, and 24 along the bottom edge.

The plate 21 has a plurality of apertures 25 in its rectangular body for receiving the screw bolts by means of which it is fastened to the wall of the street car. It is preferably installed on one of the end walls of the street car, such as the wall behind the motorman or at the end of one of the longitudinally extending bench seats on either side of the door.

The upper edge of the frame 20 is open, but is closed by means of a closing frame member 26, which has a narrow body flange 27 provided with an inwardly turned U-shaped retaining flange 28 that is similar to the flanges 22—24. Flanges 22 and 23 are miter cut at their upper ends and this is also true of the flange 28.

The closure frame member 26 is held in place by friction, having its body flange 27 slid downward behind the advertising card and behind the flanges 22 and 23 until it completes the advertising card frame 20.

The advertising card 29 of Fig. 1 simulates the face of a person whose eyes are constantly moving about in such manner as to indicate that the person on the card is looking around the street car.

Thus the card 29 has on its front a representation 30 of the face of a young lady with eye openings 31, 32 cut out to expose all of the eyeball, usually visible when the eyes of the person 30 are wide open.

The card 29 supports a pendulum 33 on its rear side for pivotal movement and this pendulum 33 is preferably so flat and thin that its movements are not hindered by the adjacent card supporting frame 20.

The shape of the pendulum 33 may vary depending upon its purpose, but in the embodiment of Fig. 1 the pendulum is substantially rectangular at its lower body 34 and is provided with rounded corners and an upwardly extending pivot flange 35.

The pendulum may be made out of a sheet of cardboard or other thin sheet material which is normally sufficiently rigid to remain flat. At its lower end pendulum 33 may have its body 34 provided with an additional layer 36 of cardboard secured to it by adhesive or by wire clips to increase the weight of the pendulum at its lower end and to increase its inertia.

The pendulum is pivotally mounted upon a bearing plate 37, comprising a small, rectangular piece of cardboard, the mounting being accomplished by means of a tubular rivet 38 passing through the cardboard plate 37 and the bearing extension 35 of the pendulum 33. Providing a separate bearing plate 37 for the pendulum eliminates any holes, rivets or the like on the face of the card and conceals the mechanism.

The cardboard plate 37 is fixedly supported on the card 29 by being cemented to a pair of rectangular cardboard spacing strips 39, 40, which in turn are cemented to the back of the card. The thickness of the spacing strips 39 and 40 is preferably such that the pendulum may move freely on its pivot 38 behind the card 29.

In the present embodiment the face of the pendulum 33 is preferably a pure white, simulating the white eyeballs at those parts which are exposed through the eye windows 31, 32. The face of the pendulum 33 bears a pair of representations 41, 42 of the eye pupils of the lady, and these may take the form of a black center representing the opening in the iris, bordered by an oval iris of appropriate color, such as brown, blue, gray or any other suitable eye color.

The representation of the pupil is preferably oval and elongated in a vertical direction to permit a maximum range of lateral movement of the eyes behind the windows 31, 32.

The pupils 41, 42 are spaced from each other sufficiently so that when the pupil 41 is disposed in the right part of the window 31, the pupil 42 is disposed in the right part of the window 32 and vice versa.

The pendulum is preferably provided with suitable stops for limiting its lateral movement so that the pupils cannot move beyond a position which appears natural, but the eyes of the animated sign may appear to move back and forth and may stop at any particular point, dependent upon the lateral movements of the vehicle.

Figure 6:
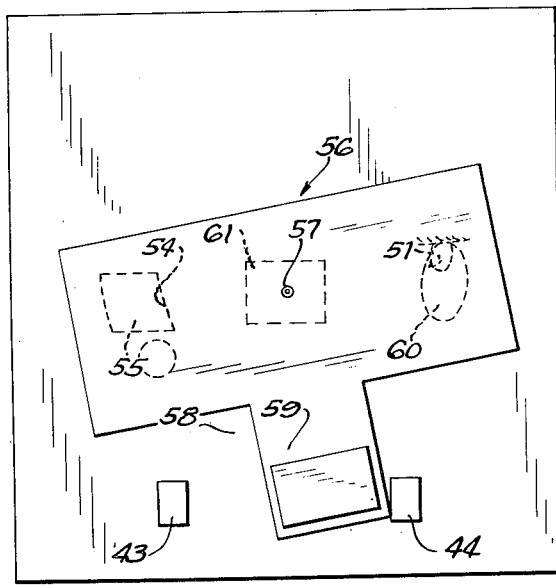
Fig. 6 is a rear elevational view of the card of Fig. 5.

In some embodiments of the invention, such as Fig. 6, the pendulum stops 43, 44 comprise small rectangles of thick carboard cemented to the back of the card 45, in position to limit the movement of the pendulum to vibration between these stops. The stops 43, 44 if of sufficient thickness may insure the spacing of the card 45 from the body 21 of the frame 20, so that the pendulum may move freely.

In the embodiment of Figs. 1 to 4, the display is preferably provided with combined stops and spacers in the form of a rectangular frame 46, extending about the body 34, of pendulum 33, and limiting its amplitude of vibration to the dotted line positions shown. Thus the spacing and stop frame 46 may consist of three strips 47, 48, 49, of thick cardboard cemented to the back of the card 29, in position to form an upwardly open rectangular frame.

As the card supporting frames 20 were originally constructed to hold cards of single thickness, the present display cards must be bowed outwardly slightly to place the lateral edges of the card beneath the retaining flanges 22 and 23, and then slid downward beneath the retaining flange 24.

By pressing backwardly on the card 29 adjacent its upper edge it can also be confined beneath the retaining flange 28, and the natural resiliency of the card tends to pull it back tightly against the body 21 of the card supporting frame 20. The card 29 is, however, spaced sufficiently from the metal back 21 by the frame 46 to insure free pivotal movement of the pendulum 33.

The spacer frame 46 causes the card to be outwardly bowed at all times, and this same bowed effect can also be secured by making the card slightly too wide for the space between the retaining flanges 22 and 23. In other words, the card being wider than the usual advertising cards, it will be bowed by its engagement behind retaining flanges 22 and 23, thus assuring space for the pendulum.

The pendulum 33 operates as follows:

The pendulum 33 is pivotally mounted at 38 upon one of the end walls of the street car and if the car sways toward the right, the pendulum by virtue of its inertia tends to remain in a vertical position. This causes the eye pupils to move to the left relative to the eye openings, but a moment later the car may sway to the left and then the eyes will appear to move back to the right.

Thus the inertia of the pendulum causes it to move constantly at irregular intervals, depending upon the side sway of the car or changes in direction of the car.

The card may bear appropriate printed matter, such as "Look Around You," and the movement of the eyes of the lady whose face is depicted on the card immediately attracts attention and causes the person looking at the card to give it attention and read the rest of the advertising matter on the card.

Figure 5:
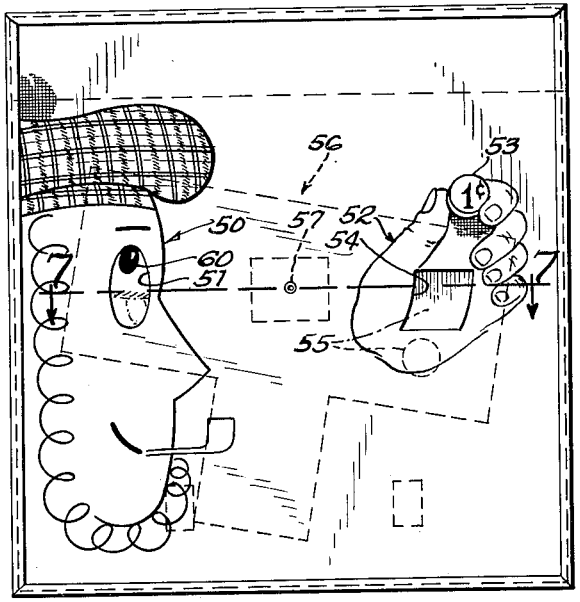
Fig. 5 is a view similar to Fig. 1 of a modification.
Figure 7:
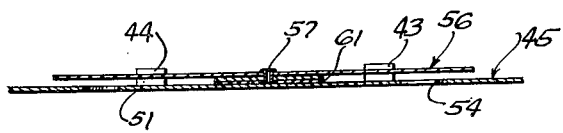
Fig. 7 is a fragmentary sectional view taken on the plane of the line 7—7 of Fig. 5.

Referring to Figs. 5 to 7, these are views showing another modification. In this case the card 45 bears a representation 50 of a part of the face of a Scotchman in profile, having one eye opening 51, and having on the opposite side of the card a representation of the hand 52 of the Scotchman.

The hand of the Scotchman holds a disc 53 representing a penny, as indicated thereon, and the hand has a rectangular window opening 54 for exposing a representation 55 of another penny.

In this case the pendulum 56 may be substantially T-shaped, being pivoted on the tubular rivet 57 at its center and having a depending portion 58 provided with additional weight or mass in the form of a plate of cardboard 59 cemented to it.

The face of the pendulum 56 may be white, which is also the color of the hand, and the pendulum 56 bears a representation of an eye pupil 60 opposite the eye opening 51. When the pupil 60 is at its upper range of movement, as shown in Fig. 5, the representation of a penny on the pendulum is at its lower range of movement not exposed in the window 54.

When the pendulum moves to expose the penny 55, in the window 54, the pupil of the Scotchman's eye has moved down to the bottom of the eye opening. The theme of this advertisement may be that of thrift with a slogan indicating "Every penny works like two" at the store of the advertiser.

In this case the pivotal mounting of the pendulum is shown at Fig. 7. The tubular rivet 57 passes through the pendulum and through a mounting card 61, and the mounting card is cemented to the back of the display card 45. The mounting plate itself serves to space the pendulum from the back of the advertising card 45, and the stop members 43, 44 serve to assure sufficient space for free movement of the pendulum.

The card is again mounted by being bowed outwardly at its central portion and is automatically actuated by the side sway movements of the vehicle and needs no motors, magnets, springs, or the like for its animation.

Figure 8:
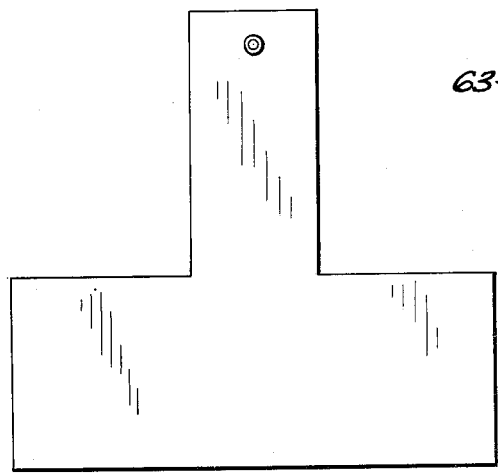
Fig. 8 is an elevational view of a modified form of pendulum.

Referring to Figs. 8, 9, 10 and 11, these show additional forms of pendulums which may be used for special purposes. For example, the pendulum of Fig. 8 is of inverted T-shape which gives the bottom of the pendulum sufficient mass so that no additional weight need be attached to it.

Figure 9:
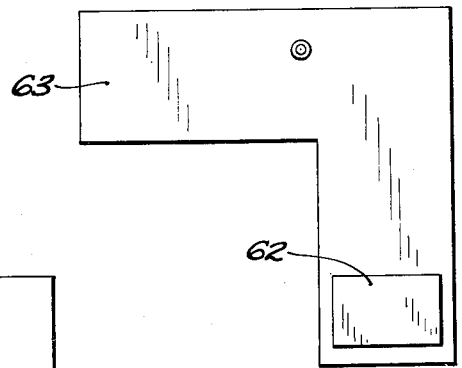
Fig. 9 shows an elevational view of another modified pendulum.

In the pendulum of Fig. 9, this is formed of L-shape, inverted, and the depending leg of the pendulum is provided with additional weight in the form of a cardboard attachment 62. This form of pendulum may be used where a vertical movement is desired at the end 63.

Figure 10:
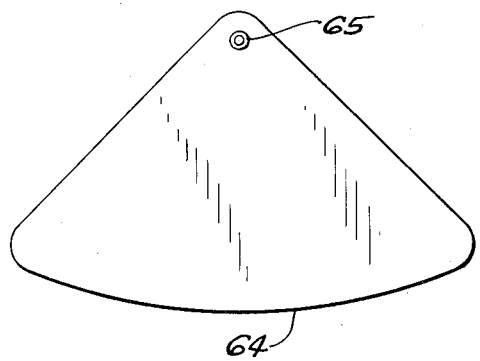
Fig. 10 shows another modification of the pendulum.

The pendulum of Fig. 10 is substantially triangular in shape with a partially circular lower edge 64, and it is pivoted at 65 adjacent its apex.

Figure 11:
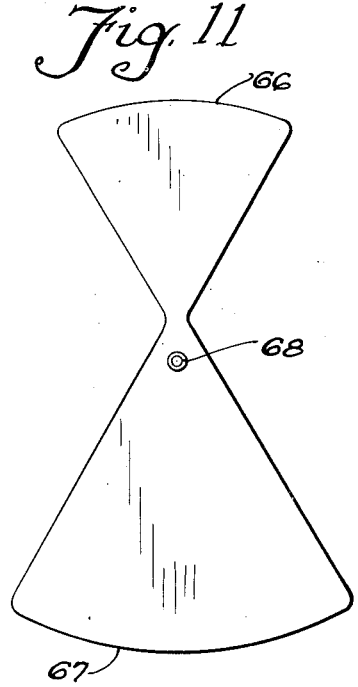
Fig. 11 shows another modification of the pendulum.

The pendulum of Fig. 11 is of the shape of a pair of triangles joined together at their apices and provided with circular upper and lower edges 66, 67. The point of pivot 68 is adjacent the juncture of the apices.

The two cards shown are exemplary of two ways of utilizing my animated advertising display.

Other possible uses are as follows:

A representation of a paint brush on the card may be caused to simulate the application of a strip of paint by the movement of the pendulum.

A glass or tumbler may be caused to simulate the filling of the glass upwardly from the bottom by the movement of a representation of a colored liquid such as wine, beer or a soft drink, moving up behind the opening corresponding to the shape of the tumbler.

The display may simulate a bottle pouring out a liquid by having the pendulum move a representation of a stream from a concealed position to an exposed position at a window opening which extends between the bottle and the glass.

An article may be caused to appear to come out of its package, such as a stick of gum moving out of the pack, by having the gum on the pendulum appear at an appropriate window opening adjacent the pack on the card.

A cigar or cigarette may assume the appearance of being lighted by having a bright pink end portion come into registry with a window opening at the end of a cigar or cigarette.

A traffic light may be caused to give the "Go" or "Stop" signal by appropriate movement of the pendulum.

It will thus be observed that I have invented an improved animated advertising display which is very simple in construction, involving only the use of cardboard, cement, printed matter and a tubular rivet.

As distinguished from the complicated animated signs of the prior art, my device requires no driving motors or magnets or source of energization or springs. It requires no attention after it has once been installed, and is adapted to be in a state of constant animation, depending upon the side swaying movements of the vehicle when it is installed with the axis of the pendulum extending longitudinally of the vehicle.

The present advertising display device may be manufactured so economically that it costs but little more than signs which lack animation, and it may be placed within the reach of a large number of the advertising business agencies.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

An animated advertising display assembly for public vehicles adapted to be secured to an end wall of the vehicle and actuated by side sway of the vehicle, comprising a metal mounting plate of rectangular shape having its edges bent forwardly and inwardly to form U-shaped retaining flanges at its borders, a cardboard advertising card of rectangular shape and of dimensions slightly larger than the inside dimensions between opposite U-shaped retaining flanges of said plate, causing the card to bow outwardly from said metal plate to provide space for moving parts, said card bearing a representation of a physical object having an opening defining a range of movement for moving parts of said display, and a pendulum of cardboard pivotally depending from and wholly behind said card, said pendulum having a representation on its face of a moving part of the physical object shown on said card, disposed behind said opening, the said pendulum tending to maintain its depending position due to its inertia, and the said card moving laterally relative to said pendulum whenever there is side sway of said vehicle, to cause an illusion of animation of the moving parts carried by said pendulum relative to said card, spacers extending around said pendulum on at least three sides positioned between said card and said plate for spacing said card from said plate to permit free relative movement of said card and pendulum, said spacers also acting as stops for said pendulum to limit the relative motion of said pendulum and the relative movement of said moving parts with respect to the borders of said opening and to assure spacing between said plate and said card for free pivotal movement of said pendulum.

MELVIN G. BARKER.

REFERENCES CITED

The following references are of record in the file of this patent:

UNITED STATES PATENTS

| Number    | Name     | Date           |
|-----------|----------|----------------|
| 1,642,671 | Davidson | Sept. 20, 1927 |
| 2,113,415 | Wallace  | Apr. 5, 1938   |
| 2,186,665 | Cabrera  | Jan. 9, 1940   |

FOREIGN PATENTS

| Number  | Country | Date           |
|---------|---------|----------------|
| 338,679 | Italy   | Mar. 31, 1936  |